United States Patent [19]
Dunleavy et al.

[11] 3,939,106
[45] Feb. 17, 1976

[54] ENERGY ABSORBING POLYURETHANE-POLYUREA CELLULAR ELASTOMERS

[75] Inventors: Raymond A. Dunleavy; Leslie E. Hawker, both of Charleston, W. Va.

[73] Assignee: Union Carbide Corporation, New York, N.Y.

[22] Filed: Mar. 20, 1973

[21] Appl. No.: 343,180

[52] U.S. Cl. ..... 260/2.5 AM; 252/182; 260/2.5 AQ; 260/2.5 BE
[51] Int. Cl.² .................. C08G 18/14; C08G 18/32; C08G 18/48
[58] Field of Search... 260/2.5 BE, 2.5 AM, 2.5 AZ, 260/2.5 AQ; 252/182

[56] References Cited
UNITED STATES PATENTS

| | | | |
|---|---|---|---|
| 3,383,351 | 5/1968 | Stamberger | 260/205 BE |
| 3,423,344 | 1/1969 | Odinak | 260/2.5 AQ |
| 3,575,896 | 4/1971 | Khan | 260/2.5 AZ |
| 3,580,869 | 5/1971 | Rhodes | 260/2.5 AM |
| 3,586,649 | 6/1971 | Cobbledick | 260/2.5 AZ |
| 3,652,639 | 3/1972 | Pizzini | 260/2.5 AZ |
| 3,732,176 | 5/1973 | Hostettler | 260/2.5 AZ |
| 3,772,222 | 11/1973 | Steward | 260/2.5 AM |
| 3,775,350 | 11/1973 | Juhas | 260/2.5 AM |
| 3,816,360 | 6/1974 | Taub | 260/2.5 BD |

OTHER PUBLICATIONS

"Niax Polyol 31-45 A Vinyl-resin-reinforced Polyol for Flexible Urethane Foam"; Union Carbide Product Information Bulletin F-41322A, Feb. 1970; pp. 1–6.
Product Report Isonol C-100; The Upjohn Co.; Sept. 1, 1966, 1 p.

*Primary Examiner*—C. Warren Ivy
*Attorney, Agent, or Firm*—Eugene C. Trautlein

[57] ABSTRACT

This invention relates to polyurethane-polyurea cellular elastomers having excellent energy absorbing properties over a wide temperature range and at various impact speeds and, more particularly, to the production of such elastomers by reacting a polymer polyol, an aromatic polyamine and, an aromatic glycol with an organic polyisocyanate. The elastomers are useful as energy absorbing components in automobile bumpers and the like.

4 Claims, No Drawings

ENERGY ABSORBING POLYURETHANE-POLYUREA CELLULAR ELASTOMERS

BACKGROUND OF THE INVENTION

1. Field of the Invention

Until fairly recently, the technology pertaining to rubber-like materials (elastomers) as force-reducing impact media has not been well quantified because of the scarcity of actual use requirements and lack of suitable test equipment. However, automotive industry trends toward safety impact bumpers brought about by legislation have significantly increased research activities to acquire such technology. Such research activities should take into account the following theoretical considerations. Yielding materials on impact reduce impact forces by decelerating the impacting object through a distance. The maximum force generated is the product of the mass of the impacting object and its maximum deceleration. Thus, if an object decelerates through a short distance, forces are higher than if an object decelerates less rapidly through a longer distance. The advantage of using rubber-like materials as impact media is that the original shape is recoverable after the impact cycle.

Rubber-like materials must meet several criteria to serve effectively as force-reducing impact media (bumpers) for automobiles. The materials must provide sufficient resistance to the impacting object to stop the object in a reasonable distance so that acceptable forces on the automobile are obtained. Then the media must return to substantially its original dimensions. These criteria must hold over the service temperature and impact speed of the operation. Further, rubbers are viscoelastic in nature (i.e., their physical properties vary as a function of temperature and strain rate). Therefore, in the evaluation of rubber-like materials as energy absorbing impact components (bumpers) for automobiles, these factors must also be taken into account. Additionally, the evaluation should simulate closely actual use conditions. Prior art bumpers employing rubber-like materials as energy absorbing media have not been entirely satisfactory.

2. Description of the Prior Art

By way of illustration, U.S. Pat. No. 3,493,257 describes a composite urethane-steel bumper stated to be capable of withstanding the impact of a 4000 pound automobile traveling at five miles per hour with a stationary object without damage to the bumper. A urethane thickness of 1.5 inches and the formulation used to produce the urethane are disclosed in the patent. Based on an analysis of that disclosure, there are shortcomings both in the urethane formulation and in the bumper design described in the patent. The approximate force generated from the given impact conditions can be calculated from the equation:

$$F = V^2 \times W \times 0.186 \times E_f/(X \times E) \quad (A)$$

where
X = stroke distance, inches
F = force, lbs.
V = velocity, ft/sec.
W = weight, lbs.
$E_f$ = energy fraction absorbed of total energy
E = Cycle Efficiency fraction Assuming the stroke is ⅔ the thickness (1.0 inch), $E_f$ is 0.3 and E is 0.5, then the force (F) calculated from equation (A) is 32,800 pounds at impact. This force is well above the force expected to be capable of deforming the steel reinforcing bar of the composite automotive bumper described in the patent.

Further, the following formulation (reaction mixture) is described in U.S. Pat. No. 3,493,257.

| Ingredient | Parts Per Hundred (by weight) |
|---|---|
| Organic Polyisocyanate | 35.8 |
| Polyol | 100 |
| Aromatic Diamine | 26.4 |
| $H_2O$ | 0.05 |

This formulation contains a 1000 molecular weight polyoxypropylene polyol and a relatively large amount of the aromatic diamine is employed. The moduli of such urethanes produced from such formulations are relatively sensitive with respect to temperature changes. The urethane becomes hard at cold temperatures thereby decreasing the amount of deflection from impact as the temperature is reduced. This effect increases object deceleration which results in increased forces on the automobile. Thus, from both urethane formulation and design considerations, the bumper of U.S. Pat. No. 3,493,257 is not suitable to meet the applicable Federal Motor Vehicle Safety Standard (i.e., FMVSS 215) requirements for a safety bumper.

As a further illustration U.S. Pat. No. 3,514,144 describes a realistic concept for an energy absorbing urethane elastomer bumper. The statement is made "with a bumper of modest dimensions, the energy of impact for a heavy automobile traveling at 5 mph can be fully dissipated by this contruction". However, no test data is given nor any description of the urethane elastomer presented. A temperature insensitive and energy absorbing elastomeric material would be required to make the urethane bumper of the latter patent functional.

Additionally, U.S. Pat. No. 3,558,529 discloses the use of a mixture of incompatible polyols for making temperature-insensitive urethane polymers that are useful as crash padding, insulation etc. However, the products of the latter patent are not entirely satisfactory energy absorbing materials. Thus, the specific disclosure of this patent (particularly the Examples) relate only to polyols which impart to the products insufficient load bearing properties for many energy absorbing applications, especially for automobile bumpers.

Further, U.S. Pat. No. 3,580,869 discloses that urethane automobile bumpers can be produced from reaction mixtures containing a polyol, an aromatic polyamine having unhindered primary amino groups, an organic polyisocyanate, and an aromatic glycol. Such reaction mixtures are relatively difficult to process unless the aromatic amine and the organic polyisocyanate are prereacted to form a prepolymer. Moreover, urethane bumpers so produced have relatively poor load-bearing properties and it is believed they have been found suitable for use only as "cosmetic" bumpers (as distinguished from energy absorbing bumpers). Improved load bearing and better processability are achieved using the polymer polyol-hindered aromatic amineorganic polyisocyanate formulations of U.S. Pat. No. 3,586,649 to produce the urethane. However, such urethanes lack the desired degree of strain rate sensitivity.

SUMMARY OF THE INVENTION

The present invention is based, in part, on the discovery that the use of relatively high molecular weight polyol starting materials in producing urethane elastomers as well as the presence of both urethane and urea structures in urethane elastomers, are needed to provide efficient energy absorbing and modulus insensitivity to temperature change for low speed impact applications. Accordingly, this invention provides a process for producing a cellular polyurethane-polyurea elastomer which comprises forming and curing a reaction mixture containing:

a. a polymer polyol comprising a major liquid polyoxyalkylene polyol that has a molecular weight of at least 1500 and a hydroxyl number from 20 to 120 and that contains therein a minor amount of a film-forming organic polymer having a molecular weight of at least 5000, b. an aromatic polyamine having at least two primary amine groups ($^-NH_2$) attached to carbon atoms of the same or different aromatic rings, at least one of such carbon atoms being adjacent to a carbon atom having a substituent other than hydrogen, c. an aromatic glycol, d. an organic polyisocyanate in an amount that provides from 0.8 to 1.3 (preferably from 0.95 to 1.1) isocyanato groups per activehydrogen group in the reaction mixture, e. a catalytic amount of catalyst for the curing of the reaction mixture to produce the elastomer, and f. a blowing agent in an amount sufficient to produce a cellular structure in the elastomer, said reaction mixture containing from 97 to 65 (preferably from 97 to 85) parts by weight of (a) and from 3 to 35 (preferably from 3 to 15) parts by weight of (b) per 100 parts by weight of (a) and (b) and said reaction mixture containing from 1 to 35 (preferably from 1 to 20) parts by weight of (C) per 100 parts by weight of (a) and (c), with the proviso that the reaction mixture contains no more than 35 parts by weight of (b) and (c) per 100 parts by weight of (a), (b) and (c).

As will be apparent to those skilled in the art, a specific formulation (reaction mixture) for an energy absorbing impact elastomer cannot be described which would answer each and every application requirement. The reaction mixture used in a particular case will depend upon the specifications necessary for satisfactory performance under the given conditions. For example, the particular operating temperature range, the final forces and deflections allowed during the impact cycle, cost requirements, processing requirements, etc. must be considered for each case.

DESCRIPTION OF THE PREFERRED EMBODIMENTS

The polymer polyols employed in the process of this invention have a liquid polyol component that has a molecular weight of at least 1500 (preferably from 2,000 to 8,400) and that has a hydroxyl number from 20 to 120 (preferably from 25 to 50 when microcellular elastomers are being produced). The polymer polyol also has a polymer component that has a molecular weight of at least 5000. The polymer component is dissolved or dispersed in the polyol component. The polymer polyol preferably contains from 85 to 60 parts by weight of the polyol and from 15 to 40 parts by weight of the polymer per 100 parts by weight of the polymer polyol. In the process of this invention, these polymer polyols react with the organic polyisocyanate to produce urethane groups. Polyols of the polymer polyol type are used in the formulations of this invention because they impart higher modulus to the elastomer than conventional polyols. Further, the polymer polyols are desired because of the modulus insensitivity to temperature of the elastomer produced therefrom. Suitable polymer polyols are disclosed in U.S. Pat. Nos. 3,304,273; 3,383,351 and 3,523,093, Belgian Patent No. 788,115, Canadian Patent No. 785,835, and in Reference 3 (identified below).

The polymers in the polymer polyols employed in the process of this invention include those produced from monomers such as hydrocarbon olefins (e.g., styrene, chlorostyrene), olefinic nitriles (e.g., acrylonitrile, methacrylonitrile), alkenyl esters of alkanoic acids (e.g., vinyl acetate, vinyl propionate, vinyl butyrate), alkyl acrylates (e.g., methyl acrylate and ethyl acrylate), alkyl methacrylates (e.g., methylmethacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the polyol.

The polyol in the polymer polyol employed in the process of this invention can be a hydroxyl-terminated polyester, a polyhydroxyalkane, a polyphenol, a polyoxyalkylene polyol, or the like. Among the polyols which can be employed are one or more polyols from the following classes of compositions, alone or in admixture, known to those skilled in the polyurethane art.

a. Alkylene oxide adducts of polyhydroxyalkanes;
b. Hydroxyl-terminated polyesters;
c. Alkylene oxide adducts of non-reducing sugars and sugar derivatives;
d. Alkylene oxide adducts of phosphorus and polyphosphorus acids;
e. Alkylene oxide adducts thereof of polyphenols;
f. The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes. Ethylene oxide capped ($-OC_2H_4OH$ terminated) propylene oxide polyols are preferred because of their increased reactivity over non-capped propylene oxide polyols thus leading to decreased demold times for the molded article. Illustrative hydroxyl-terminated polyesters are those which are prepared by polymerizing a lactone in the presence of an active hydrogen-containing starter as disclosed in U.S. Pat. No. 2,914,556.

The aromatic polyamines employed in the process of this invention contain at least two primary amino groups attached to carbon atoms of the same or different aromatic rings, at least one of such carbon atoms being adjacent to a carbon atom having a substituent other than hydrogen (i.e., at least one of the primary amino groups is "hindered"). As used herein, "polyamine" denotes a monomer or polymer containing a plurality of amino groups and does not necessarily denote a polymer of a monomeric amine. In the process of this invention, these polyamines react with the organic polyisocyanate to produce urea groups and function as chain extenders. Aromatic polyamines are used as extenders in the process of this invention because they impart high load bearing ability and modulus insensitivity to temperature to the resulting elastomer. Unlike aromatic polyamines having only unhindered primary amino groups (see U.S. Pat. No. 3,580,869), the aromatic polyamines employed in the process of the present invention are readily converted to cellular polyurethane-polyurea elastomers using the one-shot process or quasi-prepolymer process. The use of the amines of the latter patent is not desirable because of the processing difficulties inherent the use of the high viscosity prepolymer intermediates required and the prepolymer shelf instability. The prepolymer technique is necessary with such amines because using the on-shot or quasi-prepolymer techniques result in the polyisocyanate reacting preferentially with the diamine rather than with the polyol. Contrary to the suggestion in the latter patent, it has been found that the use of hindered aromatic polyamines in the process of the present invention produces cellular elastomers having compression sets and skin thickness as good or better than found in elastomers produced in the process of that patent which employs unhindered aromatic polyamines. Illustrative of suitable hindered aromatic polyamines are 3-chloro-4,4'-diaminodiphenylmethane, 4,4'-methylene bis (2-chloroaniline), cumene diamine, toluene diamine, dichlorobenzidine, etc.

The organic polyisocyanates employed in the process of this invention include monomeric and polymeric organic polyisocyanates, aliphatic and aromatic polyisocyanates and prepolymers produced by reacting a polyol with an excess of a polyisocyanate. The preferred polyisocyanates are quasi-prepolymers (especially the reaction products of excess tolylene diisocyanate and short chain polyoxypropylene diols or triols) because of the ease of processing such materials.

The aromatic glycols employed in the process of this invention include reaction products of alkylene oxides with aromatic amines or alcohols having two active hydrogens, especially reaction products of alkylene oxides with di [hydroxyalkoxy] aryl compounds and primary amino aryl compounds. In the process of this invention, the aromatic glycols react with the organic polyisocyanates to form urethane groups and function as chain extenders. Aromatic glycols are desired for extenders in the present invention because of the strain rate sensitivity of the elastomer. That is, the apparent hardness is greater at higher strain rates, thereby providing greater energy absorption at impact. They are used to improve modulus or energy absorbing ability without imparing the temperature sensitivity of the elastomer. The preferred aromatic glycols are the reaction products of ethylene oxide and aniline. Others may be used such as ethylene oxide and propylene oxide adducts of bisphenol A or the propylene oxide adducts of aniline.

Suitable polyisocyanates for use in the process of this invention include poly(arylene-isocyanates) having at least two aromatic rings with one isocyanato group on each ring. These aromatic rings are suitably interconnected by an ether, sulfone, sulfoxide, methylene, propylene, carbonyl linkage or by two methylene groups connected to a benzene ring substituted by an isocyanato group. The aromatic rings of the poly(aryleneisocyanate) can be substituted e.g., by methyl, ethyl or propyl groups. Suitable poly(aryleneisocyanates) include polymethylene poly(phenyleneisocyanates) having the formula:

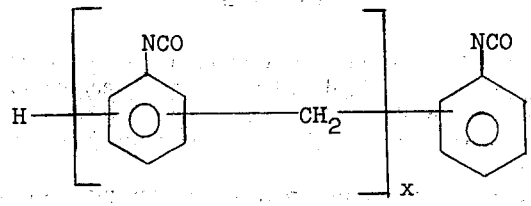

wherein x has an average value from 1.1 to 5 inclusive (preferably from 2.0 to 3.0). Other suitable polyisocyanates include 4,4'-diphenylmethylene diisocyanate; 3,3'diphenylmethylene diisocyanate; diphenyl diisocyanate; diphenylsulfone diisocyanate; diphenylsulfide diisocyanate; diphenylsulfoxide diisocyanate; and diphenylpropane diisocyanate; and the isomeric tolylene and xylene diisocyanates and their residue products.

The catalysts employed in the process of this invention accelerate the cure of the reaction mixture and include organic amines and organometallic compounds such as lead octoate, dibutyltin dilaurate, tin octoate, cobalt octoate and triethylene diamine.

The blowing agents employed in the process of this invention include any compound capable of generating an inert gas under the conditions used to cure the elastomer (e.g., by reaction to produce a gas or by volatilization). Suitable blowing agents include water and volatile halocarbons (especially chlorocarbons and chloroflurocarbons) such as methylene chloride, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1,1-fluoromethane, 1,1-difluoro-1, 2,2-trichloroethane, chloropentafluoroethane, 1-chloro-1-fluorethane, 1-chloro-2-fluoroethane, 1,1,2-trifluoroethane, 2-chloro-1,1,2,3,3,4,4-heptafluorobutane, hexafluorocylcobutane and octafluorobutane. Other useful blowing agents include low-boiling hydrocarbons such as butane, pentane, hexane, cyclohexane and the like. The amount of the blowing agent employed is determined by the desired elements of the cellular elastomer to be produced. In this connection, the elastomers produced by the process of this invention can be designed to have any of a wide range of densities, e.g., from 5 to 70 pounds per cubic foot. For certain applications e.g., for automobile bumpers, the elastomers preferably have densities from 10 to 40 and such densities can be achieved by employing from 3 to 10 parts by weight of a blowing agent (such as methylene dichloride or trichloromonofluoromethane) per 100 parts by weight of the active hydrogen-containing components and the polyisocyanate in the reaction mixture.

In the process of this invention, the reaction mixture can be formed and cured in accordance with the standard techniques known in the art. Thus, in those cases where molded microcellular elastomers are to be produced, the techniques described in Reference 2 (identified below) are applicable. A suitable process sequence is as follows:

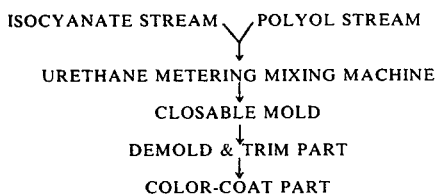

Since the polyurethane-forming and polyurea-forming reactions involved in the cure of the reaction mixtures are exothermic, curing can usually be accomplished without the application of heat from an external source.

In the practice of the process of this invention, one or more of each of the starting materials can be employed. In fact, it is often preferable to employ more than one of at least some of the starting materials, particularly the organic polyisocyanate (i.e., mixtures of isomeric tolylene diisocyanates) and catalyst (i.e., both tin and amine catalysts).

Mixtures comprising the polymer polyols, aromatic polyamines and the aromatic glycols useful in the process of this invention are novel compositions of matter that also constitute a part of this invention. Thus, this invention also provides mixtures composed of (a), (b) and (c) above in the relative amounts indicated above.

The cellular elastomers produced in accordance with this invention are useful as energy absorbing components in automobile bumpers, packaging and the like.

The molecular weights of the polyols and polymer polyols described herein are weight average molecular weights.

EXPERIMENTAL

The following experimental description illustrates the present invention. In the experimental description, the following abbreviations are used.

| Abbreviation | Meaning |
| --- | --- |
| Reference 1 | Hintzen, H. and Dunleavy, R. A., "An Energy Absorbing Elastomeric Bumper", Paper presented at the SAE Meeting, Detroit, Michigan, January, 1973. This reference describes the same experimental work as appears below with respect to "Compounds A, B and C". |
| Reference 2 | Dunleavy, R. A., "Some Aspects of the Microcellular Urethane Material and Process", J. Elastoplastics, 2, January, 1970. |
| Reference 3 | Kuryla, W. C., et al., "Polymer/Polyols, a New Class of Polyurethane Intermediates", J. Cellular Plastics, March, 1966. |
| lb. | pound |
| max | maximum |
| min | minute |
| ft | foot |
| pli | pounds per linear inch |
| pcf | pounds per cubic foot |
| pph | parts by weight per 100 parts by weight |
| % | percent |
| mph | miles per hour |
| Resin | Blend of the active hydrogen-containing components and catalyst used to produce a polyurethane elastomer. |
| Activator | Blend of the isocyanate component and blowing agent used to produce a polyurethane elastomer. |
| R/A | Weight Ratio of Resin to Activator |
| EW (Equivalent Weight) | A unit basis for calculation of reactant weight ratios. It is the weight of a substance that theoretically combines with one gram of hydrogen or eight grams of oxygen, i.e., EW (Hydrogen) = 1 and EW (Oxygen) = 8. |
| Hydroxyl Number (OH No.) | A measure of the equivalent weight of a hydroxyl-containing substance. $$\text{OH No.} = \frac{56.1 \times 1000}{EW}$$ Expressed as milligrams of potassium hydroxide per gram of material. |
| FNCO (Free Isocyanate) | A measure of the EW of an isocyanate-containing material. $$\% \text{ FNCO} = \frac{4.2}{EW} \times 1000$$ Expressed as the weight percent of the reactive or free isocyanate content of a substance. |
| Polyol A | A polyalkylene oxide triol produced from propylene and ethylene oxides and glycerine and having a molelcular weight of |

| Abbreviation | Meaning |
|---|---|
| | about 4,900. The alkylene oxide units are present primarily in blocks and the primary OH content is about 75%. The ethylene oxide is used to "cap" the triol. Based on its alkylene oxide content this triol contains 85 wt-% $C_3H_6O$ and 15 wt-% $C_2H_4O$. |
| Polymer/Polyol I | A polymer/polyol having EW = 2000 and produced by polymerizing 20 weight percent acrylonitrile in 80 weight percent Polyol A. The polymer in this polymer polyol has a molecular weight of over 5000. |
| Isocyanate A | This is a quasi prepolymer containing 30 weight percent free NCO produced by reacting (a) an excess of a mixture containing 80 weight percent 2,4-tolylene diisocyanate and 20 weight percent 2,6-tolylene diisocyanate with (b) dipropylene glycol. |
| Isocyanate B | 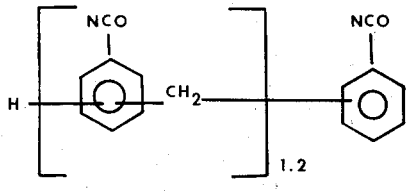 Sold as "ISONATE 901" |
| Aromatic Diol I | 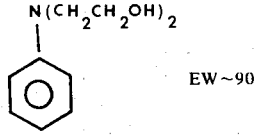 EW~90 |
| Aromatic Diamine I | A reaction product of aniline, 2-chloroaniline and formaldehyde. The reaction product is a mixture of aniline, 2-chloroaniline, 4,4'-methylene dianiline (MDA), 3-chloro-4,4'-diaminodiphenylenethane and 4,4'-methylene bis(2-chloroaniline) (MOCA). The reaction product has EW=126. |
| Aromatic Diamine II | A reaction product differing from Aromatic Diamine I in that its EW=128. |
| DABCO 33LV | 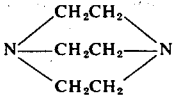 |
| T-12 | dibutyltin dilaurate |

"Stream Weight Ratios" (R/A) referred to below are calculated as follows:

Three values are required for calculation of the stream weight ratio of polyol to isocyanate: the free isocyanate content of the isocyanate and the hydroxyl number and moisture content of the polyol. They can be determined by standard and analytical methods. Sample Calculations follow:

Given: Isocyanate Stream FNCO = 26.0%
Polyol Stream OH No. = 142
Polyol Stream $H_2O$ Content = .090%

Moisture reacts with the isocyanate and is not accounted for by the OH No. of the polyol. The OH No. must be corrected by adding the OH No. equivalent of the water to the OH No.

$0.090 \times 62.3 = 5.6$
$142 + 5.6 = 148$ (corrected OH No.)

The equivalent weight (EW) of the polyol and of the isocyanate are then calculated. Percent FNCO is based upon EW 42 (NCO) and OH No. is based upon EW 56.1 (KOH).

$$\text{EW Isocyanate} = \frac{4.2 \times 1000}{26} = 162$$

$$\text{EW Polyol} = \frac{56.1 \times 1000}{148} = 380$$

Since one equivalent of isocyanate plus one equivalent of polyol are required to make a urethane polymer of FNCO/OH equivalent ratio of 1.00 (or 100 index) then weight ratio of polyol to isocyanate = 380/162 = 2.34.

If an index other than 100 is desired the formula is $$R_I = \frac{R \times 100}{\text{Index}}$$

Where $R$ = the weight ratio for 100 index

And $R_I$ = the weight ratio for any index other than 100

For example, the calculation for a 103 index is:
$R_I = (2.34/103) \times 100 = 2.27$ Where $I = 103$ or 2.27 parts of the polyol should be reacted with 1.00 parts of the isocyanate to provide a urethane polymer of 103 isocyanate index.

The following foaming characteristics and foam properties were observed or measured with regard to various cellular polyurethane-polyurea elastomeric produced as described below.

Cream Time The interval of time from the formation of the complete formulation to the appearance of a creamy color in the formulation. The cream time is proportional to the rate of reaction of the formulation.

Rise Time The interval of time from the formation of the complete formulation to the attainment of the maximum height of the cellular elastomer.

Tack Free Time The interval of time from the formation of the complete formulation to the disappearance of the tacky feel from the surface of the resulting elastomer.

For the sake of brevity, the microcellular polyurethane-polyurea elastomers described below are sometimes referred to simply as "urethanes".

Criteria

Present day performance criteria for elastomers as force-reducing impact media are somewhat limited. Therefore, functional goals were set up for the experiments described below which, it was felt, if met would produce a material of satisfactory performance. These are given below:

a. The capability to absorb energy of the level encountered in low speed (<10 mph) vehicle collisions over the service temperature in a minimal distance.

b. Good surface appearance and a coatable surface.

c. The capability of being easily processed with available relatively low cost equipment.

d. Shelf stable chemical intermediates suitable for commercial operation, available and of relatively low cost.

These requirements seem best answered by the use of an integral-skin microcellular urethane rubber for the force-reducing impact media. A microcellular urethane rubber is the product resulting from the in-process density reduction of a solid urethane elastomer. Solid urethanes inherently possess many performance advantages over natural and synthetic rubbers, e.g., strength properties over a wide temperature range, abrasion and solvent resistance. The reduction in density, or foaming, is done for a variety of reasons, not least among them is cost reduction, when the properties of the expanded product can meet established performance criteria. Other advantages over liquid-cast solid elastomers are moldability (internal pressure causes excellent mold fill-out and simplicity of process). These materials are inherently flexible for engineering property variation through formulation. Microcellular urethane material and process were described in depth in Reference 2.

Reaction Mixtures

Three types of reaction mixtures were prepared for evaluation by pendulum impact testing. These "Compounds" (reaction mixtures) were designated "Compounds A, B, and C". The formulations, processing conditions, and reactivity are given in Tables 1, 2, and 3 below for microcellular urethanes A, B, and C, respectively produced from these Compounds. Their basic difference is use of aromatic diol extenders (A), aromatic diamine extenders (B) and both aromatic diamine and aromatic diol extenders (C), as follows:

Compound A - This compound was formulated to simulate the so-called "cosmetic" urethane which is in commercial use today on automotive bumpers primarily as a decorative, as distinguished from an energy absorbing, component. This urethane is known to be relatively temperature sensitive with respect to change in modulus.

Compound B - This compound was formulated to improve modulus sensitivity to temperature.

Compound C - This compound was formulated to improve modulus sensitivity to temperature as well as to retain much of the force pick up ability of Compound a expected in dynamic pendulum testing.

The starting materials were processed via a urethane metering-mixing machine into 20 × 3 ×5 inch deep test blocks for pendulum impact testing. Materials were formulated to bracket expected performance requirements.

Processing

The following preparation of an elastomer from Compound C is typical of the preparations of all the elastomers of this invention described in this Experimental section: The Resin and Activator components (blends) were prepared for processing on a small Martin Sweets urethane metering-mixing machine (15–20 lb/min max thruput). The weights of the ingredients used are shown below in their order of addition.

| Resin | Wt. (grams) | Activator | Wt. (grams) |
|---|---|---|---|
| Polymer Polyol I | 37,568 | Isocyanate A | 18,160 |
| Aromatic Diol I | 410 | Methylene Chloride | 4,540 |
| Aromatic Diamine I | 2,860 | | |
| DABCO 33LV | 275 | | |
| T-12 | 55 | | |

The above weights of Resin materials were combined in a ten-gallon unheated container and mixed under nitrogen for an hour with a mounted Lightning Mixer. The initial temperature of Polymer Polyol I was 25°C. The Diol and Diamine were each heated for 4 hours in a 100°C air oven before addition to the mix. The DABCO 33LV and T-12 catalyst were blended at ambient temperature (75°F) prior to mixing. The above weights of Activator were mixed separately under nitrogen for 30 minutes at ambient temperature (75°F). The prepared Resin and Activator components were charged into their respective pots on the Martin Sweets and circulated. Samples were taken from the machine for chemical analyses (FNCO, $H_2O$, OH No.) for calculation of stream weight ratio. The ratio was calculated upon receipt of the chemical analysis. The metering pumps on the Martin Sweets were adjusted to deliver the desired ratio and thruput to the mixing head. The components were delivered to the heated mold for making the part. Ten minutes was allowed for ambient cure before the part was removed from the mold.

Testing

Physical properties were measured on samples of each formulated product by standard ASTM rubber tests. These test results are given in Table 4 below. The ASTM test methods used for each measurement are shown in Table 5 below. Compression moduli at 25 per cent deflection as a function of temperature were established on the three Compounds and are shown in Table 5A below.

Examination of the physical property test data indicates that formulation goal expectations were achieved. Improvement in the modulus insensitivity to temperature from Compound A to B to C is clearly evident in the hardness values as well as the compression modulus values of the elastomers produced from the three Compounds.

Pendulum to moveable vehicle impact evaluation of the microcellular urethane block was made at three temperatures, $-20°F$, $75°F$, and $120°F$. The test samples were conditioned in temperature boxes for at least twelve hours prior to the dynamic test, mounted on the vehicle at ambient temperature and immediately impacted. The vehicle weight was 3500 lbs. as well as the pendulum. Impacts were made at 4.0, 5.0, and 5.5 mph. Forces and deflection were measured concurrently and read out as xy force deflection plots. The test samples were identified as follows:

| | |
|---|---|
| Compound A Block | AB |
| Compound B Block | BB |
| Compound C Block | CB |

A total of 18 pendulum to moveable vehicle impacts were made. The parameters, Max Force, Max Deflection, Stored Absorbed Energy, Hysteresis Energy, Vehicle Compliance, Coefficient and Cycle Efficiency were taken from and/or calculated from the individual dynamic load deflection data. These data are shown in Table 6.

To obtain further information on the dynamic impact properties of the three microcellular urethanes, pendulum to rigid fixture impact tests were made. The pendulum to moveable vehicle tests which had been done previously were simulated in that $75°F$ and $120°F$ impacts were made at 30% of the energy generated in a 5.5 mph/3500 lb. vehicle impact. The $-20°F$ impact was made at ½ or 15% of the total energy with the exception of Compound A which was made at 1/6 or 5% of the total 5.5 mph/3500 lb. vehicle impact. In each case a 2400 lb. pendulum was used and the velocities were 3.64, 2.57, and 1.49 mph for the 30%, the 15%, and the 5% energy impact, respectively. These data are shown in Table 7 below for the designated test samples. Each of the evaluation parameters were explored which were previously mentioned. An explanation of the various impact evaluation parameters appears below:

Max Force - read directly from the dynamic force deflection curve (lbs.).

Max Deflection - read directly from the dynamic force deflection curve (inches).

Absorbed Energy - total area under "in cycle" on dynamic force deflection curve (ft. lbs.).

Hysteresis Energy - difference between total area under "in cycle" and "out cycle" curve on dynamic force deflection curve (ft. lbs.).

Vehicle Compliance Coefficient - calculated from the equation
$C = (E_T-E_A)/F^2$ where
$C$ = vehicle compliance coefficient (ft./lb.)
$E_T$ = total energy into vehicle (ft./lbs.)
$E_A$ = absorbed energy in urethane (ft./lbs.)
$F$ = max force (lbs.)

For pendulum to moveable vehicle impact, it is assumed that the excess energy remaining in the pendulum after impact and the energy put into the vehicle in elastic collision total 50% of the original total pendulum energy available to the vehicle at impact. The compliance coefficient thus is the reciprocal of the vehicle spring constant. For pendulum to fixture impact the equation is simply
$C = (E_T-E_A)/F^2$ Cycle Efficiency Fraction - calculated from the equation:
$E = X_T/X$
where
$X_T = (V^2 \times W \times 0.183 \times E_f)/F$
when
$X_T$ = theoretical deflection (inches)
$X$ = actual measured deflection (inches)
$V$ = velocity of impact (ft./sec.)
$W$ = weight vehicle (lbs.)
$E_f$ = fraction absorbed energy of total energy
$F$ = max force (lbs.)

An ideal impact media provides minimum max deflection at impact velocity for a given force. Thus, one can define efficiency for the cycle on the deflection obtained for the force level. A constant force square wave deflection would in this case be classified as 100% efficiency.

Examination of the pendulum to moveable vehicle impact data and the calculated parameters clearly shows the superiority of Compounds B and C over Compound A with respect to temperature sensitivity. This increase in hardness of the microcellular urethane elastomer at $-20°F$ results in rapid deceleration and thus high force levels. This trend could be predicted from the hardnesses and compression moduli of the respective urethanes as a function of temperatures as shown in Tables 4 and 5A below.

Of interest is the distribution of the energy fraction as a function of temperature for each of the Compound blocks. The absorbed energy fraction varied from 3 to 41% in the urethane during impact. The total energy picture for the pendulum to moveable vehicle model may be expressed according to the following equation.

| $E_T$ | = | $E_P$ | + | $E_A$ | + | $CF^2$ | + | $E_c$ |
|---|---|---|---|---|---|---|---|---|
| (100%) | | (2-5%) | | (3-40%) | | (10-30%) | | (50%) | where
$E_p$ = the remaining KE in the pendulum after an in-line impact
$E_A$ = absorbed energy in the urethane
$CF^2$ = absorbed energy in the vehicle assuming it acts as a spring
$E_c$ = energy lost to the vehicle to provide movement; this is assumed to be about a perfect elastic collision The urethane bumper and the vehicle itself may be considered in combination on impact as a temperature sensitive spring (the urethane) in series with a constant (over temperature) spring (the vehicle). If the urethane becomes hard at cold temperatures and does not deflect and absorbs much energy this energy is transmitted to the vehicle and results in greater deflection of the vehicle frame which is of course not desirable. Both springs have a common force but different deflections depending upon the spring constant of each. The vehicle can take so much energy without destructing, so it is important to design relatively temperature-insensitive urethane compounds for automotive bumpers.

The hysteresis energy seems relatively constant, percentage-wise, for Compounds B or C, 10–12% of the total energy across the temperature range. It is higher for Compound A which is a "deader" material than B and C as shown by the physical property data in Table 4 below (Bashore Resilience).

The vehicle compliance coefficient, the reciprocal of the vehicle's spring constant, should be constant. The data show differently which indicates there may be another variable in the picture which is unknown at the present. Some apparent trends for the vehicle compliance coefficient for pendulum to moveable vehicle impact are:

a. It increases upon impact as the temperature of the urethane block test sample is increased. This may be because of the relatively poor impact instability of block with regard to dimension.

b. It increases upon impact as the speed of impact is increased.

c. It decreases upon impact as the temperature of the urethane shape sample is increased. This may be due to lack of the necessary load pick up at higher temperature resulting in some bottoming-out.

The Cycle Efficiency calculated for the pendulum to moveable vehicle impacts seems reasonable at 50% to 60%. There is some scatter in the data, which is expected. There is an apparent trend of lower efficiency at higher temperature which is most likely due to force "slip through" as the urethane softens.

To provide further insight on the impact characteristics of the compounds, the pendulum to fixture impact was analyzed in a similar manner, see Table 7 below. General observations were made as follows:

a. Only 70–80% of the total energy put into the system was picked up as absorbed energy. This may be a function of temperature of the sample and/or the amount of total energy put into the sample. Some energy might have been picked up by deflection of the fixture or the pendulum itself may have twisted during impact. This is not the entire picture because the vehicle compliance coefficients were not constant.

b. The hysteresis energy, in general, decreased as the temperature of the urethane decreased. This is to be expected as seen in the original physical property data. See Table 4 below.

c. Similar trends were found for vehicle compliance and for cycle efficiency as previously shown in the pendulum to moveable vehicle impact evaluation. They still remain at this time not totally understandable. Future work should include the actual measurement of vehicle compression so this variable may be explored.

This part of the experimental program showed the superiority of the B and C type compounds over A. Compound A displayed more modulus sensitivity to temperature which caused low deflection and greater deceleration at low temperatures resulting in higher impact forces than B and C. This sensitivity to modulus also caused higher frame deflection since the A compound actually absorbed much less energy (3% vs. 15%) than B or C at low temperature. This excess energy was transmitted to the frame of the vehicle.

Modulus sensitivity to temperature can also be brought about in polyurethane formulating by the use of a low molecular weight polyol and/or too much chain extender, either diamine or glycol. These results are illustrated by U.S. Pat. No. 3,493,257 in which both of these premises were violated. To demonstrate this, the formulation of U.S. Pat. No. 3,493,257 was prepared ("13RAD105-7") and tested. The physical screening properties are shown in Table 8 below and 25% compression moduli vs. temperature are shown in Table 5A below compared to similar test data on Compounds A and C. The sensitivity to temperature is worse than Compound A which was judged unsatisfactory. Therefore, the formulation of U.S. Pat. No. 3,493,257 would not be expected to functionally perform if the application were over a normal ambient exterior service range.

Unpublished work had suggested that diamine urethanes would be less strain rate sensitive as well as less temperature sensitive than glycol urethanes. One would then expect less force resistance at impact speeds for the aromatic diamine system than the aromatic glycol system. This would result in what is termed "slip through" in the aromatic diamine system, in which, because of this lack of resistance, forces are not picked up as the impacting object goes through the compression cycle. This results in lower energy absorption, lower efficiency, and higher final forces. An indication of this phenomenon is the pendulum to vehicle impact evaluation of Compounds A, B, and C. See BB vs. CB at 5.5 mph impact speed. The force at 120°F was greater than the force at 75°F for the B compound (12,000 lbs. vs. 11,300 lbs.). This is an indication of "slip through" at the higher temperature. This was verified by a 7% decrease in the cycle efficiency for BB. For CB this was not the case, the 120°F force was 12,500 lbs. compared to 13,400 lbs. obtained at 75°F. The cycle efficiency changed only 3% compared to the 7% observed for the B compound.

Therefore, three more microcellular urethane compounds (Compounds A1, B1, and C1) were impacted at higher energy levels to ascertain the validity or advantage of utilizing the merits of glycol-diamine mixtures as extenders for the microcellular urethane rubber-like impact media as represented by the Type C compound.

Tables 9, 10, and 11 below show the formulation process conditions and reactivity for compounds A1, B1, and C1, respectively. Their physical properties are shown in Table 12 below as measured by those standard ASTM rubber tests given in Table 5. These compounds were selected for dynamic impact studies because, (a) they represented the three classes of compounds, (b) they were of similar density, and (c) their compression moduli at 50% and 75°F were for all practical purposes at the same level.

All conditions were the same as described previously for the pendulum to fixture test except that the energy level was made higher to explore the "slip through" evidently experienced in the testing of the Compound B. The weight of the pendulum in this series of tests was 4000 lbs. and the speed of the pendulum was varied to obtain the desired energy level. In line with the previous pendulum to fixture impact tests the energy fraction absorbed as assumed to be 80% of the total for 75°F and 125°F tests and 70% for the −20°F tests, with the exception of Compound A1 which was assumed to be 50% at −20°F. This was necessary because all the measuring equipment which was available was the load cell for force measurements and modeling clay for total deflection measurement. It was not possible to actually measure the energy fraction.

The pendulum to fixture impact data is shown in Table 13 below. The "slip through" phenomenon is shown dramatically in the B1 compound at 1500 ft. lbs. impact energy by the low force obtained at −20°F (14,800 lbs.) and the much higher forces measured at 75°F and 125°F — 30,000 and 32,000 lbs., respectively. The C1 compound yield forces upon impact according to expectation. The A1 compound once again exhibited temperature sensitivity to modulus by the high force obtained at <20°F. The "slip through" phenomenon is further demonstrated by the calculated cycle efficiencies for the B1 compound which are relatively low at 75°F and 125°F 17 and 16 per cent, respectively.

Impacts at higher input energy, 2400 and 3300 ft. lbs. were explored for the C1 compound. This data as seen in Table 13 below shows that the compound needs to be designed to cover a certain range of impact energy. The C1 compound for example would require either a higher density, a higher modulus at the same density with comparable temperature insensitivity or perhaps an increased depth of urethane to functionally operate at impact energies of 2000 ft. lbs. or higher.

TABLE 1

Formulation, Process Conditions and Reactivity for Compound A Microcellular Urethane (9RAD110)*

Formulation

| pph | Resin | pph | Activator |
|---|---|---|---|
| 100 | Polymer Polyol I | 32.8 | Isocyanate A |
| 15 | Aromatic Diol I | 8.2 | Methylene Chloride |
| 0.125 | DABCO 33LV | | |
| 0.25 | T-12 | | |

OH No. = 106    % FNCO = 24.5
% $H_2O$ = 0.10

Process Conditions

| Resin Temperature, °F | 112 |
|---|---|
| Activator Temperature, °F | 75 |
| Stream Weight Ratio, R/A | 2.80 |
| Isocyanate Index | 105 |
| Mold Temperature, °F | 150–155 |
| Thruput, lb/min | 15.5 |

Reactivity

| Cream Time, sec. | 8–10 |
|---|---|
| Rise Time, sec. | 50–55 |
| Tack-Free Time, sec. | 60–65 |

*such designations herein are notebook references

TABLE 2

Formulation, Process Conditions and Reactivity for Compound B Microcellular Urethane (12RAD52)

Formulation

| pph | Resin | pph | Activator |
|---|---|---|---|
| 100 | Polymer Polyol I | 19.1 | Isocyanate A |
| 7.5 | Aromatic Diamine I | 4.8 | Methylene Chloride |
| 0.30 | DABCO 33LV | | |
| 0.15 | T-12 | | |

TABLE 2-continued

Formulation, Process Conditions and Reactivity for Compound B Microcellular Urethane (12RAD52)

Formulation

| pph | Resin | pph | Activator |
|---|---|---|---|

OH No. = 57    % FNCO = 24.5
% $H_2O$ = 0.2

Process Conditions

| Resin Temperature, °F | 130 |
|---|---|
| Activator Temperature, °F | 75 |
| Stream Weight Ratio, R/A | 4.5 |
| Isocyanate Index | 105 |
| Mold Temperature, °F | 155 |
| Thruput, lb/min | 14.5 |

Reactivity

| Cream Time, sec. | 20–22 |
|---|---|
| Rise Time, sec. | 110–120 |
| Tack-Free Time, sec. | 130–140 |

TABLE 3

Formulation, Process Conditions and Reactivity for Compound C Microcellular Urethane (8RAD124 or 12RAD130)

Formulation

| pph | Resin | pph | Activator |
|---|---|---|---|
| 92 | Polymer Polyol I | 17.9 | Isocyanate A |
| 1 | Aromatic Diol I | 4.5 | Methylene Chloride |
| 7 | Aromatic Diamine II | | |
| 0.67 | DABCO 33LV | | |
| 0.13 | T-12 | | |

OH No. = 62.3    % FNCO = 24.5
% $H_2O$ = 0.122

Process Conditions

| Resin Temperature, °F | 126 |
|---|---|
| Activator Temperature, °F | 76 |
| Stream Weight Ratio, R/A | 4.45 |
| Isocyanate Index | 105 |
| Mold Temperature, °F | 155 |
| Thruput, lbs/min | 16.2 |

Reactivity

| Cream Time, sec. | 12 |
|---|---|
| Rise Time, sec. | 70–75 |
| Tack-Free Time, sec. | 90 |

Table 4

Physical Properties of Microcellular Urethane Compounds A, B, and C

| Research Notebook Reference | 9RAD110 | 12RAD52 | 8RAD124 |
|---|---|---|---|
| | A | B | C |
| Density pcf | 30 | 31 | 32 |
| Hardness, Shore A at | | | |
| −20°F | 70 | 59 | 58 |
| 75°F | 34 | 47 | 47 |
| 125°F | 30 | 45 | 48 |
| 100% Modulus, psi | 180 | 308 | 330 |
| Tensile Strength, psi | 525 | 385 | 415 |
| Ultimate Elongation, % | 275 | 130 | 130 |
| C Tear, pli | 55 | 50 | 55 |
| B Compression Set, % | 10 | 22 | 24 |
| 50% Compression Modulus, psi | 110 | 195 | 210 |
| Bashore Resilience, % at | | | |
| −20°F | 11 | 22 | 22 |
| 75°F | 14 | 22 | 22 |
| 125°F | 21 | 56 | 57 |

TABLE 5

| Property | Physical Test Methods ASTM Method | Specimen Size* |
|---|---|---|
| Density | D1564 | 1"×1"×½" thick |
| Hardness | D2240 | 1"×1"×½" thick |
| Tensile Strength | D412 | ⅛"–¼" thick |
| Tear | D624C | ⅛"–¼" thick |
| Compression Set | D395B 22 hr at 158°F 50% compressed | 1"×1"×½" thick |
| Compression Modulus | D575 | 1"×1"×½" thick |
| Bashore Resilience | D2632 | 1"×1"×½" thick |

*" denotes inch

TABLE 5A

Effect of Temperature on 25% Compression Modulus of Microcellular Urethane Elastomers
25% Compression Modulus, psi

| Temperature °F | Urethane A 9RAD110-2 | Urethane B 12RAD52B | Urethane C 8RAD124 | Urethane of USP 3,493,257 13RAD105-7 |
|---|---|---|---|---|
| −20 | 431 | 161 | 199 | 775 |
| 0 | 422 | 166 | 190 | 435 |
| 72 | 47 | 84 | 93 | 103 |
| 100 | 43 | 87 | 91 | 101 |
| 125 | 35 | 83 | 92 | 97 |

Table 6

Pendulum to Vehicle Impact Evaluation of Microcellular Urethanes A, B, and C

| Test Sample | AB | AB | BB | BB | BB | CB | CB |
|---|---|---|---|---|---|---|---|
| Velocity Impact, mph | 4.0 | 5.5 | 4.0 | 5.0 | 5.5 | 4.0 | 5.5 |
| Max. Force, lbs at | | | | | | | |
| −20°F | 18,500 | — | 13,500 | — | 17,750 | 15,500 | 19,500 |
| 75°F | 10,000 | 12,500 | 8,750 | 11,000 | 11,300 | 9,500 | 13,400 |
| 120°F | 6,750 | 11,400 | 8,500 | — | 12,000 | 8,700 | 12,500 |
| Max. Deflection, inches at | | | | | | | |
| −20°F | 0.15 | — | 0.54 | — | 0.72 | 0.50 | 0.62 |
| 75°F | 1.30 | 1.71 | 1.65 | 1.97 | 1.97 | 1.50 | 1.93 |
| 120°F | 2.40 | 2.71 | 1.95 | — | 2.26 | 1.75 | 2.23 |
| Absorbed Energy, ft lbs at | | | | | | | |
| −20°F | 55 | — | 356 | — | 615 | 313 | 555 |
| 75°F | 655 | 1177 | 676 | 970 | 1010 | 630 | 1154 |
| 120°F | 752 | 1210 | 725 | — | 1109 | 684 | 1184 |
| Absorbed Energy, % at | | | | | | | |
| −20°F | 3 | — | 19 | — | 17 | 17 | 16 |
| 75°F | 35 | 33 | 36 | 33 | 29 | 34 | 33 |
| 120°F | 41 | 34 | 39 | — | 31 | 37 | 34 |
| Hysteresis Energy, ft lbs at | | | | | | | |
| −20°F | 45 | — | 260 | — | 425 | 246 | 416 |
| 75°F | 470 | 890 | 218 | 323 | 349 | 212 | 410 |
| 120°F | 362 | 630 | 185 | — | 338 | 222 | 340 |
| Hysteresis Energy, % at | | | | | | | |
| −20°F | 2 | — | 14 | — | 12 | 13 | 12 |
| 75°F | 25 | 25 | 12 | 11 | 10 | 11 | 12 |
| 120°F | 20 | 18 | 10 | — | 10 | 12 | 10 |
| Vehicle Compliance Coefficient X10⁶, ft/lb at | | | | | | | |
| −20°F | 2.5 | — | 3.1 | — | 3.7 | 2.6 | 3.2 |
| 75°F | 2.7 | 3.7 | 3.2 | 4.0 | 5.9 | 3.3 | 3.4 |
| 120°F | 3.8 | 4.2 | 2.8 | — | 4.5 | 3.2 | 3.7 |
| Cycle Efficiency, % at | | | | | | | |
| −20°F | 24 | — | 60 | — | 58 | 50 | 56 |
| 75°F | 62 | 66 | 57 | 54 | 56 | 53 | 54 |
| 120°F | 56 | 47 | 55 | — | 49 | 54 | 51 |

Table 7

Pendulum to Fixture Impact Evaluation of Microcellular Urethanes A, B and C

| Test Sample | AB | BB | CB |
|---|---|---|---|
| Max. Force, lbs at | | | |
| −20°F | 12,400 | 12,800 | 14,200 |
| 75°F | 9,100 | 9,000 | 9,300 |
| 120°F | 7,300 | 8,700 | 8,600 |
| Max. Deflection, inches at | | | |
| −20°F | 0.15 | 0.60 | 0.56 |
| 75°F | 1.68 | 2.11 | 1.99 |
| 120°F | 2.82 | 2.35 | 2.26 |
| Absorbed Energy, ft lbs at | | | |
| −20°F | 86 | 363 | 390 |
| 75°F | 875 | 855 | 850 |
| 120°F | 835 | 860 | 815 |
| Absorbed Energy, % at | | | |
| −20°F | 49 | 69 | 74 |
| 75°F | 82 | 80 | 80 |
| 120°F | 79 | 81 | 77 |
| Hysteresis Energy, ft lbs at | | | |
| −20°F | 55 | 295 | 315 |
| 75°F | 705 | 416 | 425 |
| 120°F | 500 | 328 | 342 |
| Hysteresis Energy, % | | | |
| −20°F | 31 | 56 | 59 |
| 75°F | 67 | 39 | 40 |
| 120°F | 47 | 31 | 32 |
| Vehicle Compliance Coefficient X10⁶, ft/lb at | | | |
| −20°F | 0.6 | 1.0 | 0.7 |
| 75°F | 2.4 | 2.5 | 2.4 |
| 120°F | 4.2 | 2.6 | 3.3 |
| Cycle Efficiency, % at | | | |
| −20°F | 56 | 57 | 59 |
| 75°F | 69 | 54 | 56 |
| 120°F | 49 | 51 | 51 |

Table 8

Physical Properties of USP 3,493,257 Microcellular Urethane (Prepared by UCC-13RAD105-7)

| | |
|---|---|
| Density, pcf | 26 |
| Hardness, Shore A at | |
| −20°F | 78 |
| 75°F | 54 |
| 125°F | 52 |
| 100% Modulus, psi | 280 |
| Tensile Strength, psi | 350 |
| Ultimate Elongation, % | 160 |
| C Tear, pli | 80 |
| B Compression Set, % | 34 |
| Bashore Resilience, % at | |
| −20°F | 16 |
| 75°F | 24 |
| 125°F | 33 |
| 50% Compression Modulus, psi | 215 |

TABLE 9

Formulation, Process Conditions and Reactivity for Compound A1 Microcellular Urethane (12RAD96)

Formulation

| pph | Resin | pph | Activator |
|---|---|---|---|
| 88 | Polymer Polyol I | 17.6 | Isocyanate A |
| 10 | Aromatic Diol I | 7.0 | Methylene Chloride |
| 2 | Diethylene Glycol | | |
| 0.25 | DABCO 33LV | | |
| 0.05 | T-12 | | |

OH No. = 108   %FNCO = 24.5
% $H_2O$ = 0.05

Process Conditions

| | |
|---|---|
| Resin Temperature, °F | 116 |
| Activator Temperature, °F | 75 |
| Stream Weight Ratio R/A | 2.8 |
| Isocyanate Index | 105 |
| Mold Temperature, °F | 155 |
| Thruput, lb/min | 15.8 |

Reactivity

| | |
|---|---|
| Cream Time, sec. | 8 |
| Rise Time, sec. | 70 |
| Tack-Free Time, sec. | 85 |

TABLE 10

Formulation, Process Conditions and Reactivity for Compound B1 Microcellular Urethane (12RAD40-5)

Formulation

| pph | Resin | pph | Activator |
|---|---|---|---|
| 100 | Polymer Polyol I | 15.5 | Isocyanate B |
| 5 | Aromatic Diamine II | 3.8 | Methylene Chloride |
| 0.25 | DABCO 33LV | | |
| 0.025 | T-12 | | |

OH No. = 59.6   %FNCO = 26.2
% $H_2O$ = 0.15

Process Conditions

| | |
|---|---|
| Resin Temperature, °F | 121 |
| Activator Temperature, °F | 75 |
| Stream Weight Ratio, R/A | 5.46 |
| Isocyanate Index | 105 |
| Mold Temperature, °F | 155 |

TABLE 10-continued

Formulation, Process Conditions and Reactivity for Compound B1 Microcellular Urethane (12RAD40-5)

Formulation

| pph | Resin | pph | Activator |
|---|---|---|---|
| | | | |

Thruput, lbs/min   14

Reactivity

| | |
|---|---|
| Cream Time, sec. | |
| Rise Time, sec. | |
| Tack-Free Time, sec. | |

TABLE 11

Formulation, Process Conditions and Reactivity for Compound C1 Microcellular Urethane (12RAD 102)

Formulation

| pph | Resin | pph | Activator |
|---|---|---|---|
| 90 | Polymer Polyol I | 21.6 | Isocyanate A |
| 7 | Aromatic Diol I | 5.4 | Methylene Chloride |
| 3 | Aromatic Diamine II | | |
| 0.65 | DABCO 33LV | | |
| 0.2 | T-12 | | |

OH No. = 80.9   %FNCO = 24.5
% $H_2O$ = 0.05

Process Conditions

| | |
|---|---|
| Resin Temperature, °F | 118 |
| Activator Temperature, °F | 75 |
| Stream Weight Ratio R/A | 3.7 |
| Isocyanate Index | 105 |
| Mold Temperature, °F | |
| Thruput, lbs/min | 15.1 |

Reactivity

| | |
|---|---|
| Cream Time, sec. | 6 |
| Rise Time, sec. | 120–130 |
| Tack-Free Time, sec. | 140–150 |

TABLE 12

Physical Properties of Microcellular Urethane Compounds A1, B1 and C1

| Research Notebook Reference | 12RAD96 $A_1$ | 12RAD40-5 $B_1$ | 12RAD102 $C_1$ |
|---|---|---|---|
| Density, pcf | 33 | 32 | 35 |
| Hardness, Shore A at | | | |
| −20°F | 75* | 64 | 76 |
| 75°F | 55 | 51 | 49 |
| 125°F | 39 | 57* | 45 |
| 100% Modulus, psi | 139 | — | 210 |
| Tensile Strength, psi | 334 | 220 | 438 |
| Ultimate Elongation, % | 220 | 70 | 200 |
| C Tear, pli | 64 | 23 | 63 |
| B Compression Set, % | 9 | 14 | 16 |
| 50% Compression Modulus, psi | 220 | 226 | 224 |
| Bashore Resilience, % at | | | |
| −20°F | 14 | 23 | 16 |
| 75°F | 19 | 56 | 17 |
| 125°F | 23 | 64 | 27 |

*anomalous data

Table 13

Pendulum to Fixture Impact Evaluation of Microcellular Urethanes A1, B1 and C1

| Test Samples | A1B | B1B | C1B | C1B | C1B |
|---|---|---|---|---|---|
| Max. Force, lbs at | | | | | |
| −20°F | 38,800 | 14,800 | 30,000 | 38,000 | — |
| 75°F | 10,400 | 30,000 | 12,000 | 17,600 | 26,000 |
| 125°F | 14,000 | 32,000 | 10,800 | 22,000 | 32,000 |

Table 13-continued

Pendulum to Fixture Impact Evaluation of Microcellular Urethanes A1, B1 and C1

| Test Samples | A1B | B1B | C1B | C1B | C1B |
|---|---|---|---|---|---|
| Max. Deflection, inches at | | | | | |
| −20°F | 0.32 | 1.42 | 0.33 | 0.58 | — |
| 75°F | 1.78 | 2.75 | 1.63 | 2.06 | 2.36 |
| 125°F | 2.68 | 2.85 | 2.24 | 2.60 | 2.90 |
| Absorbed Energy, ft lbs at | | | | | |
| −20°F | 750 | 1030 | 750 | 1680 | 2320 |
| 75°F | 1200 | 1200 | 1200 | 1920 | 2640 |
| 125°F | 1200 | 1200 | 1200 | 1920 | 2640 |
| Absorbed Energy, % at | | | | | |
| −20°F | 50 | 70 | 50 | 70 | 70 |
| 75°F | 80 | 80 | 80 | 80 | 80 |
| 125°F | 80 | 80 | 80 | 80 | 80 |
| Vehicle Compliance Coefficient X10$^6$, ft/lb at | | | | | |
| −20°F | 0.50 | 2.08 | 0.83 | 0.50 | — |
| 75°F | 2.78 | 0.33 | 2.08 | 1.55 | 0.98 |
| 125°F | 1.53 | 0.29 | 2.56 | 0.99 | 0.65 |
| Cycles Efficiency, % at | | | | | |
| −20°F | 72 | 69 | 90 | 57 | — |
| 75°F | 78 | 17 | 60 | 45 | 23 |
| 125°F | 48 | 16 | 48 | 26 | 15 |

What is claimed is:

1. A process for producing a cellular polyurethane-polyurea elastomer useful as the energy absorbing component in automobile bumpers which process comprises forming and curing a reaction mixture consisting essentially of:
   a. a polymer polyol comprising a liquid polyoxyalkylene polyol that has a molecular weight of at least 1500 and a hydroxyl number from 20 to 120 and that contains therein film-forming organic polymer having a molecular weight of at least 5000, said polymer polyol consisting essentially of from 85 to 60 parts by weight of the polyol and from 15 to 40 parts by weight of the polymer per 100 parts by weight of the polymer polyol and said polymer having been produced polymerizing in said polyol at least one monomer selected from the group consisting of hydrocarbon olefins, olefinic nitriles, alkenyl esters of alkanoic acids, alkyl acrylates, alkyl methacrylates and unsaturated aliphatic acids;
   b. an aromatic polyamine having at least two primary amine groups attached to carbon atoms of the same or different aromatic rings, at least one of such carbon atoms being adjacent to a carbon atom having a chlorine substituent and each such aromatic ring consisting of carbon and hydrogen;
   c. an aromatic glycol, said glycol being the reaction product of an alkylene oxide with an aromatic amine consisting of carbon, hydrogen and nitrogen, said nitrogen being in an amino group, and said aromatic amine having two active hydrogens provided by the amino group or an aromatic alcohol consisting of carbon, hydrogen and oxygen, said oxygen being in hydroxyl groups, and said alcohol having two active hydrogens; provided by the hydroxyl groups;
   d. an organic polyisocyanate in an amount that provides from 0.8 to 1.3 isocyanato groups per active-hydrogen group in the reaction mixture;
   e. a catalytic amount of catalyst for the curing of the reaction mixture to produce the elastomer; and
   f. a blowing agent in an amount sufficient to produce a cellular structure in the elastomer, said reaction mixture containing from 97 to 65 parts by weight of (a) and 3 to 35 parts by weight of (b) per 100 parts by weight of (a) and (b) and said reaction mixture containing from 1 to 35 parts by weight of (c) per 100 parts by weight of (a) and (c), with the proviso that the reaction mixture contains no more than 35 parts by weight of (b) and (c) per 100 parts by weight of (a), (b) and (c).

2. An elastomer produced by the process of claim 1.

3. A mixture useful in producing a cellular polyurethane-polyurea elastomer useful as the energy absorbing component in automobile bumpers which mixture consists essentially of:
   a. a polymer polyol comprising of liquid polyoxyakylene polyol that has a molecular weight of at least 1500 and a hydroxyl number from 20 to 120 and that contains therein film-fomring organic polymer having a molecular weight of at least 5000, said polymer polyol consisting essentially of from 85 to 60 parts by weight of the polyol and from 15 to 40 parts by weight of the polymer per 100 parts by weight of the polymer polyol and said polymer having been produced polymerizing in said polyol at least one monomer selected from the group consisting of hydrocarbon olefins, olefinic nitriles, alkenyl esters of alkanoic acids, alkyl acrylates, alkyl methacrylates and unsaturated aliphatic acids;
   b. an aromatic polyamine having at least two primary amine groups attached to carbon atoms of the same or different aromatic rings, at least one of such carbon atoms being adjacent to a carbon atom having a chlorine substituent and each such aromatic ring consisting of carbon and hydrogen; and
   c. an aromatic glycol, said glycol being the reaction product of an alkylene oxide with an aromatic amine consisting of carbon, hydrogen and nitrogen, said nitrogen being in an amino group, and said aromatic amine having two active hydrogens provided by the amino group or an aromatic alcohol consisting of carbon, hydrogen and oxygen, said oxygen being in hydroxyl groups, and said alcohol having two active hydrogens; provided by the hydroxyl groups;

said mixture containing from 97 to 65 parts by weight of (a) and 3 to 35 parts by weight of (b) per 100 parts by weight of (a) and (b) and said mixture containing from 1 to 35 parts by weight of (c) per 100 parts by weight of (a) and (c), with the proviso that the mixture contains no more than 35 parts by weight of (b) and (c) per 100 parts by weight of (a), (b) and (c).

4. A mixture as claimed in claim 3 wherein (a) is a polymer polyol comprising a liquid polyoxypropylene triol that has terminal —$OC_2H_4OH$ groups, that has a molecular weight from 2000 to 8400, that has a hydroxyl number from 25 to 50 and that contains therein a film-forming acrylonitrile polymer having a molecular weight of at least 5000, said polymer polyol containing 85 to 60 parts by weight of the polyol and from 15 to 40 parts by weight of the polymer per 100 parts by weight of the polymer polyol; (b) is 4,4'-methylene bis(2-chloroaniline); and (c) is the reaction product of two moles, an alkylene oxide and one mole of a primary aromatic amine, said mixture containing from 97 to 85 parts by weight of (a) and from 3 to 15 parts by weight of (b) per 100 parts by weight of (a) and (b) and from 1 to 20 parts by weight of (c) per 100 parts by weight of (a) and (c), with the proviso that the mixture contains no more than 35 parts by weight of (b) and (c) per 100 parts by weight of (a), (b) and (c).

* * * * *

PO-1050
(5/69)

UNITED STATES PATENT OFFICE
CERTIFICATE OF CORRECTION

Patent No. 3,939,106  Dated February 17, 1976

Inventor(s) R. A. Dunleavy et al

It is certified that error appears in the above-identified patent and that said Letters Patent are hereby corrected as shown below:

Col. 1, line 59, so much of the formula as reads "(X x E" should read -- (X x E) --.

Col. 2, line 36, after "by this", "contruction" should be -- construction --.

Col. 3, line 28, after "groups per", "activehydrogen" should be -- active hydrogen --.

Col. 5, line 63, after "without", "imparing" should be -- impairing --.

Col. 6, lines 50-51, "hexafluorocylcobutane" should be -- hexafluorocyclobutane --.

Col. 11, lines 13, "I = 103" should be -- i = 103 --.

Col. 12, lines 25-26, after "ability of", "Compound a" should be -- Compound A --.

Col. 17, line 1, after "absorbed", "as" should be -- was --.

Col. 17, line 18, after "obtained at", "<20°F" should be -- -20°F --.

Col. 24, line 37, after "therein", "film-fomring" should be -- film-forming --.

Signed and Sealed this

Fifth Day of April 1977

[SEAL]

Attest:

RUTH C. MASON
Attesting Officer

C. MARSHALL DANN
Commissioner of Patents and Trademarks